(12) United States Patent
Stojkovic et al.

(10) Patent No.: US 9,884,578 B2
(45) Date of Patent: Feb. 6, 2018

(54) PICK-UP TRUCK BED WITH ROPE TIE-DOWN CLEATS AND METHOD OF MANUFACTURING TIE-DOWN CLEATS

(71) Applicant: Ford Global Technologies, LLC, Dearborn, MI (US)

(72) Inventors: Dragan B. Stojkovic, Taylor, MI (US); Joshua R. Hemphill, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/071,451

(22) Filed: Mar. 16, 2016

(65) Prior Publication Data
US 2017/0267157 A1    Sep. 21, 2017

(51) Int. Cl.
B60P 7/08    (2006.01)

(52) U.S. Cl.
CPC .................. B60P 7/0807 (2013.01)

(58) Field of Classification Search
CPC .................................................. B60P 7/0807
USPC .......... 410/102, 106, 110, 116; 29/412, 417, 29/557, 558; 24/115 K, 129 R, 129 B, 24/265 CD; 114/218
See application file for complete search history.

(56) References Cited

U.S. PATENT DOCUMENTS

| | | | |
|---|---|---|---|
| 2,309,666 A * | 2/1943 | Parker | B21K 1/24 |
| 3,125,058 A * | 3/1964 | Peterson | B63B 21/08 |
| | | | 114/218 |
| 4,174,119 A | 11/1979 | Biles | |
| 4,541,149 A | 9/1985 | Jensen | |
| 4,850,770 A | 7/1989 | Millar, Jr. | |
| 5,443,341 A | 8/1995 | Hamilton | |
| 5,920,963 A | 7/1999 | Chou | |
| 5,987,711 A | 11/1999 | Parsons | |
| 6,039,520 A | 3/2000 | Cheng | |
| 6,618,912 B1 | 9/2003 | Chang | |
| 6,953,312 B1 * | 10/2005 | Wheatley | B60P 7/0815 |
| | | | 410/106 |
| 9,038,247 B2 | 5/2015 | Dodge | |
| 2002/0168242 A1 | 11/2002 | Lin | |
| 2009/0260195 A1 | 10/2009 | Howard | |

FOREIGN PATENT DOCUMENTS

| | | |
|---|---|---|
| CN | 101765728 | 6/2010 |
| CN | 102525039 | 7/2012 |

* cited by examiner

*Primary Examiner* — Stephen Gordon
(74) *Attorney, Agent, or Firm* — Jason Rogers; Brooks Kushman P.C.

(57) ABSTRACT

A tie-down assembly for a pick-up truck bed that includes a cleat including a base having first and second feet defining first and second fastener receiving holes, a body portion extending from an outer side of the feet, and first and second arms extending from the body portion that are spaced from the feet and define tie-down holes. Fasteners inserted into the first and second fastener holes secure the cleat to the pick-up truck bed. A method of making a tie-down cleat for a pick-up truck bed by extruding an elongated bar having a pair of feet portions connected by a body portion to a pair of arm portions. The elongated bar is cut into a plurality of planar cleat blanks and the cleat blanks are drilled to form fastener holes in the feet portions and tie-down holes in the arm portions.

9 Claims, 4 Drawing Sheets

PICK-UP TRUCK BED WITH ROPE TIE-DOWN CLEATS AND METHOD OF MANUFACTURING TIE-DOWN CLEATS

TECHNICAL FIELD

This disclosure relates to pick-up truck bed cargo tie-down apparatus and a method of manufacturing tie-down cleats.

BACKGROUND

Pick-up trucks are favored by consumers due to the cargo carrying capabilities and flexibility afforded by the pick-up truck bed. A wide variety of different types of cargo may be conveniently transported in the bed. Different types of cargo may be secured with different specialized straps with hooks, bungee cords with hooks, tie downs with ratchet tighteners, and the like. Some types of cargo may be tied down with a rope.

Ropes are readily available and may be cut to size but normally it is not desirable to cut a rope because a shorter rope may be less useful than a longer rope. Using a rope to tie down cargo to a loop or ring may necessitate threading the rope through the ring and tightening the rope at each tie down location. To securely tie down some types of cargo with a rope, it may be necessary to tie the rope down by threading a rope through each loop which may be very time-consuming. At each tie-down location the rope must be pulled until the rope is tight or the cargo could shift in transit.

Pick-up truck bed cargo tie-downs have been developed that are complex structures requiring assembly of multiple parts. Stamped sheet metal parts, injection molded parts, or cast parts must be assembled together to provide a tie down apparatus that is clipped to a receptacle provided on the floor or walls of the pick-up truck bed. Such complex pick-up truck tie downs are relatively complicated to manufacture and are costly accessories.

Forces applied to a tie-down cleat are transferred to the base of the tie-down cleat that abuts a wall or the floor of the pick-up truck bed. A small base applies the force to a smaller part of the wall or floor and may potentially result in distortion of the surface of the wall or floor.

This disclosure is directed to solving the above problems and other problems as summarized below.

SUMMARY

According to one aspect of this disclosure, a tie-down assembly is provided for a pick-up truck bed. The tie-down assembly includes a cleat including a base having first and second feet defining first and second fastener receiving holes, a body portion extending from an outer side of the feet, and first and second arms extending from the body portion spaced from the feet, wherein the arms define tie-down holes. A plurality of fasteners are inserted into the first and second fastener holes and into openings defined by the pick-up truck bed to secure the cleat to the pick-up truck bed.

According to other aspects of this disclosure as it relates to the tie-down assembly, the body portion may further comprise a pair of posts extending from the outer side of the feet to the first and second arms. The posts may extend perpendicularly from the outer side of the feet to the first and second arms. Alternatively, the posts may extend from the outer side of the feet and diverge from each other as the posts approach the arms. The first and second feet and the first and second arms lie in a single plane. The first and second tie-down holes may be axially aligned with the first and second fastener holes. The cleat may be a planar body having a first lateral side and a second lateral side that are parallel to each other and extend from the base across the body portion and to the arms. The base may have a width "$W_1$" that is greater than the width "$W_2$" of the body portion.

According to another aspect of this disclosure, a method is disclosed for making a tie-down cleat for a pick-up truck bed. The method includes the step of extruding an elongated bar having a pair of feet connected by a body portion to a pair of arms. The elongated bar may be cut into a plurality of planar cleat blanks including part of the feet, the body portion the arm portions. Fastener holes are drilled in the feet portions and tie-down holes are drilled in the arms.

According to other aspects of the method, the elongated bar has an extrusion axis corresponding to the direction that the bar is extruded, and the step of cutting the bar may be performed by cutting the bar perpendicular to the extrusion axis to form the plurality of planar cleat blanks. The step of drilling the fastener holes may be performed by drilling through the feet in a direction perpendicular to the extrusion axis. The step of drilling the tie-down holes may be performed by drilling through the arms in a direction perpendicular to the extrusion axis.

In one variation of the method, the step of drilling the fastener holes may be performed by drilling through the feet in a direction perpendicular to the lengthwise axis, and the step of drilling the tie-down holes may be performed by drilling through the arms in a direction perpendicular to the lengthwise axis. The fastener holes and the tie-down holes may be axially aligned and the same drilling operation may be utilized to form the fastener holes and tie-down holes.

The method may further comprise milling a first side of the body portion and the arms to reduce a thickness of the body portion and the arms. Alternatively, the method may further comprise milling a second side of the body portion and the arms to reduce a thickness of the body portion and the arms relative to a width of the feet portions.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
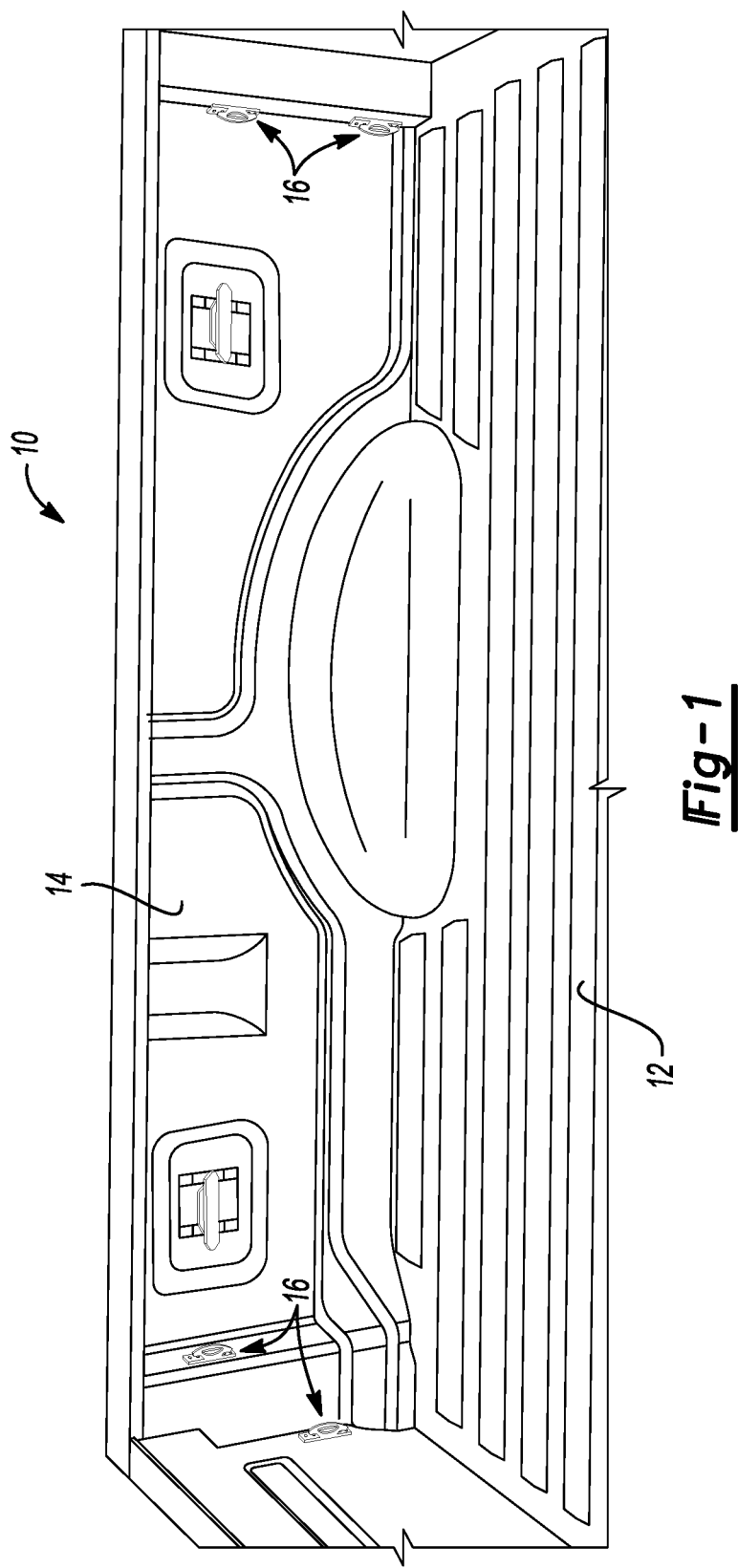
FIG. 1 is a fragmentary inside elevation view of a pick-up truck bed with tie-down cleats made according to one embodiment of this disclosure.

Referring to FIG. 1, a pick-up truck is generally indicated by reference numeral 10 and is partially illustrated to focus on the truck bed. The truck bed includes a bed floor 12 and a plurality of bed walls 14. Several tie-down assemblies 16 are shown on the bed walls 14, but it should be understood that the tie-down assemblies could also be provided on the bed floor 12.

Figure 2:
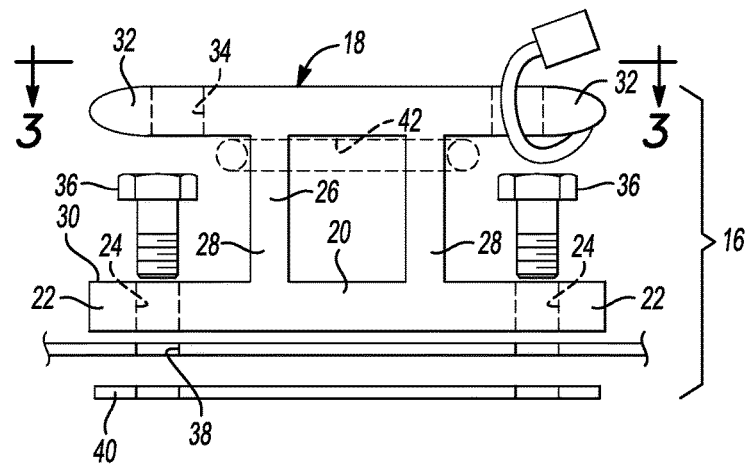
FIG. 2 is an elevation view of the tie-down cleat illustrated in FIG. 1.

Referring to FIG. 2, a tie-down assembly 16 is illustrated that includes a cleat 18. The cleat 18 includes a base 20 that includes a pair of feet 22. The feet 22 define fastener receiving holes 24. The cleat 18 also includes a body portion 26. In the embodiment shown in FIGS. 2-4, the body portion 26 is formed by a pair of posts 28 that extend perpendicularly from the outer side 30 of the base 20.

The cleat 18 also includes a pair of arms 32. The arms 32 define a pair of tie-down holes 34 that are adapted to receive the hook of a bungy cord or other type of specialized connector.

Fasteners 36 are inserted into the fastener receiving holes 24 defined by the feet 22. The fasteners 36 are inserted through openings 38 that are defined by the bed floor 12. A reinforcement plate 40 is also illustrated that may be included if the portion of the pick-up truck 10 where the tie-down assembly 16 is installed does not have sufficient strength to support a specified load.

A rope 42, or elongated strand, is illustrated in phantom lines in FIG. 2 to illustrate how a rope 42 may be wrapped around the body portion 26 or posts 28 of the cleat 18.

Figure 3:
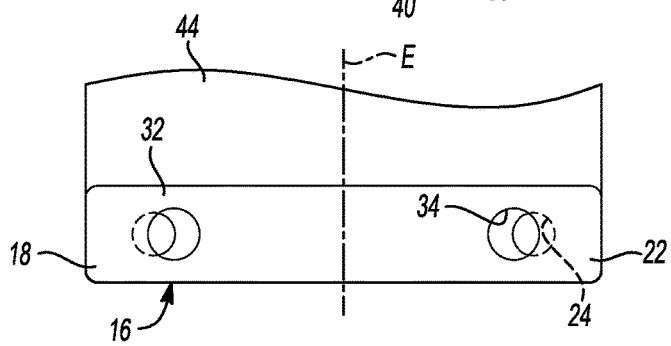
FIG. 3 is a plan view taken along the line 3-3 in FIG. 2.
Figure 4:
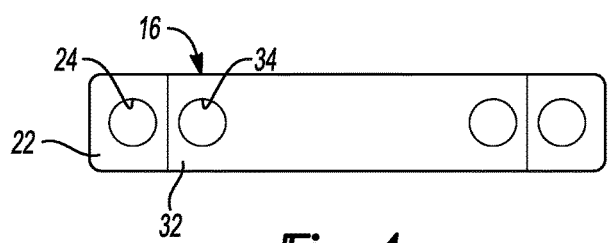
FIG. 4 is a plan view of an alternative embodiment of a tie-down cleat similar to FIG. 3.

Referring to FIG. 4, an alternative embodiment of a tie-down assembly 16 is shown that differs from the embodiment shown in FIGS. 2 and 3 by providing arms that are shorter compared to the base 20 so that the feet 22 of the base defining the fastener receiving holes 24 are outboard of the arms 32. By locating the fastener receiving hole 24 outboard of the ends of the arms 32, better access may be afforded for a drilling operation or a fastener installation operation.

Figure 5:
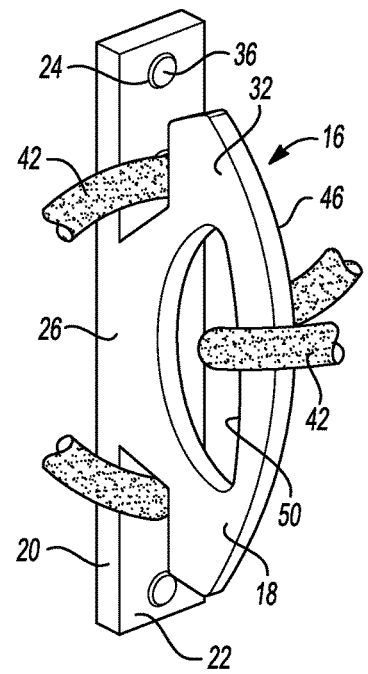
FIG. 5 is a perspective view of another embodiment of a tie-down cleat with an offset enlarged base.

Referring to FIG. 5, another alternative embodiment is illustrated. The tie-down assembly 16 includes the cleat 18 that includes the base 20 and feet 22 that define the fastener receiving holes 24. The body portion 26 of the cleat 18 includes divergent posts. The body portion 26 provides a necked down area below the arms 32. A rope 42 can be wrapped around the body portion 26 and retained by the arms 32. Alternatively, a rope 42 may be passed through an opening 50 in the body 26. Fasteners 36, such as the illustrated rivets or other types of fasteners, may be inserted into the opening 24 to secure the tie-down assembly 16 to the pick-up truck (shown in FIG. 1).

Figure 6:
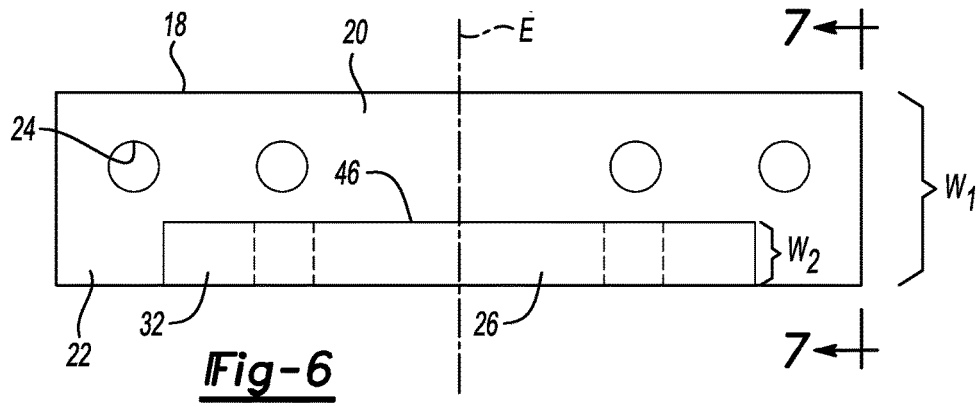
FIG. 6 is a plan view of the tie-down cleat shown in FIG. 5.
Figure 7:
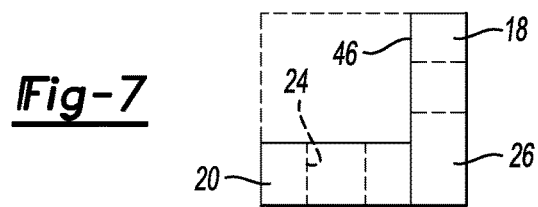
FIG. 7 is an end view of the tie-down cleat shown in FIG. 5.

Referring to FIGS. 5-7, the cleat 18 is shown to include a first lateral side 46. In the embodiment of FIGS. 5-7, the cleat 18 may be extruded in the direction of the extrusion axis "E" with the shape of the body portion and arms being extruded as the elongated bar (shown in FIG. 3). Referring specifically to FIG. 7, the dashed lines on the upper left side of the view indicate the shape of the cleat 18 as it is extruded and the material between the dashed lines and the base 20 and body portion 26 is cut away or milled by cutting tools.

Figure 8:
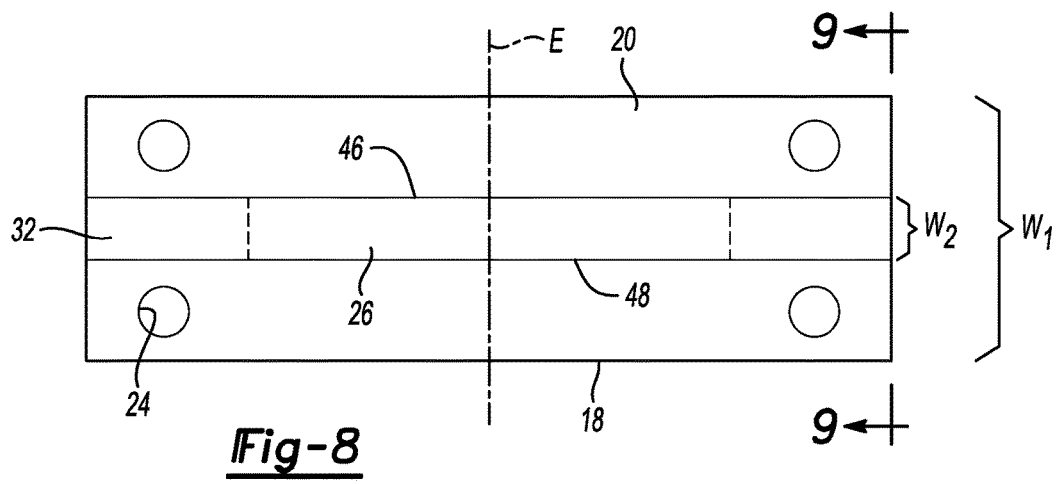
FIG. 8 is a plan view of the tie-down cleat with the cleat centered on an enlarged base.
Figure 9:
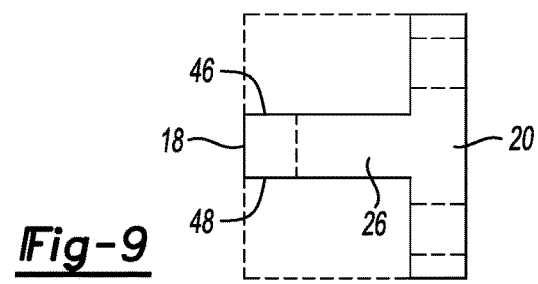
FIG. 9 is an end view of the tie-down cleat shown in FIG. 8.

Referring to FIGS. 8 and 9, another alternative embodiment of the cleat 18 is shown wherein the body portion 26 and arms 32 are cut away on a first lateral side 46 and a second lateral side 48 to form a body portion 26 that is centered relative to the base 20. The base 20 defines a plurality of fastener receiving holes 24. The width $W_1$ of the base 20 is wider than the width $W_2$ of the body portion 26. As shown in FIG. 8, the length of the arms 32 may be coextensive with the length of the base 20.

Figure 10:
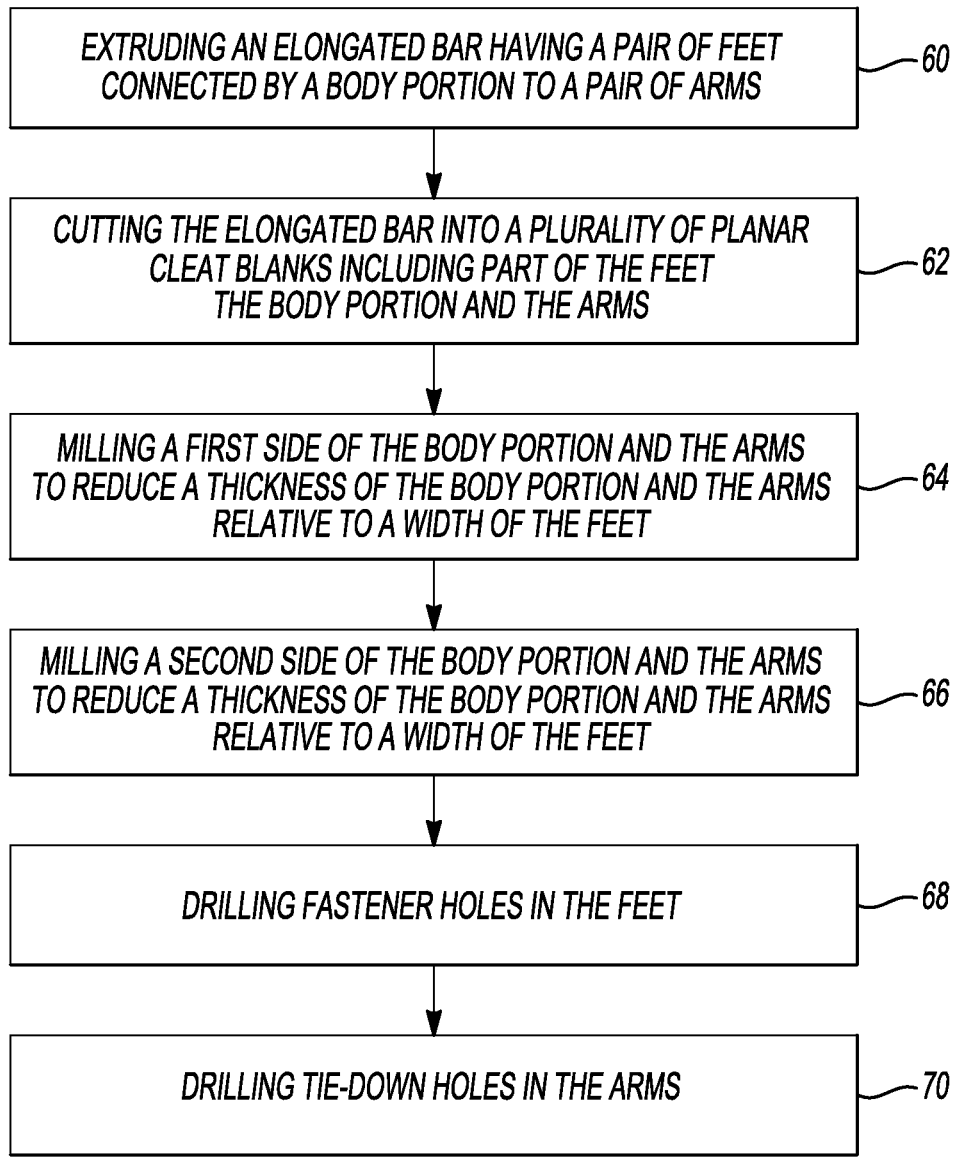
FIG. 10 is a flowchart of the method of making an extruded tie-down cleat.

Referring to FIG. 10, a flowchart of a method of making the cleat 18 is illustrated. Reference numerals to the parts below are to the parts identified in FIGS. 1-9. Referring to the Figures, in a first step of the method, an elongated bar 44 is extruded to have a pair of feet 22 that are connected by a body portion 26 to a pair of arms 32, at 60.

The elongated bar 44 is cut, at 62, into a plurality of planar cleat blanks including part of the feet 22, body portion 26 and the arms 32.

A first side 46 of the body portion 26 and the arms 32 are cut away by a milling or machining operation to reduce the thickness of the body portion 26 and the arms 32 relative to a width of the feet 22, at 64. A second side 48 of the body portion 26 and the arms 32 may also be cut away, at 66, to reduce the thickness of the body portion 26 and the arms 32 relative to the width of the feet 22. It should be understood that additional cutting operations may be used to shorten the arms 32 or round-off the corners of the base 20 and arms 32.

Fastener holes 24 are drilled in the feet 22, at 68, and tie-down holes 34 may be drilled, at 70, in the arms 32.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of making a tie-down cleat for a pick-up truck bed comprising:
   extruding an elongated bar having a pair of feet connected by a body portion to a pair of arms;
   cutting the elongated bar into a plurality of planar cleat blanks including the feet, the body portion, and the arms;
   drilling fastener holes in the feet; and
   drilling tie-down holes in the arms.

2. The method of claim 1 wherein the elongated bar has an extrusion axis corresponding to a direction that the bar is extruded, and wherein the step of cutting the bar is performed by cutting the bar perpendicular to the extrusion axis to form the plurality of planar cleat blanks.

3. The method of claim 2 wherein the step of drilling the fastener holes is performed by drilling through the feet in a direction perpendicular to the extrusion axis and perpendicular to a direction that the bar is cut.

4. The method of claim 2 wherein the step of drilling the tie-down holes is performed by drilling through the arms in a direction perpendicular to the extrusion axis.

5. The method of claim 2 wherein the step of drilling the fastener holes is performed by drilling through the feet in a direction perpendicular to the extrusion axis, and wherein the step of drilling the tie-down holes is performed by drilling through the arms in a direction perpendicular to the extrusion axis.

6. The method of claim 2 further comprising:
   milling a first side of the body portion and the arms to reduce a thickness of the body portion and the arms relative to a width of the feet.

7. The method of claim 6 further comprising:
   milling a second side of the body portion and the arms to reduce a thickness of the body portion and the arms relative to a width of the feet.

8. The method of claim 1 wherein the fastener holes and the tie-down holes are axially aligned and wherein the same drilling operation is performed to form the fastener holes and tie-down holes.

9. The method of claim 1 wherein the elongated bar is an extruded aluminum bar.

\* \* \* \* \*